(12) United States Patent
Dwivedi et al.

(10) Patent No.: US 12,392,859 B2
(45) Date of Patent: Aug. 19, 2025

(54) LINE OF SIGHT DETECTION BASED ON CHANNEL IMPULSE RESPONSE REPORTED

(71) Applicant: Telefonaktiebolaget LM Ericsson (publ), Stockholm (SE)

(72) Inventors: Satyam Dwivedi, Solna (SE); Jonas Medbo, Uppsala (SE); Henrik Asplund, Stockholm (SE); Erik Stare, Sollentuna (SE); Per Ernström, Stockholm (SE); Deep Shrestha, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 813 days.

(21) Appl. No.: 17/609,468

(22) PCT Filed: Apr. 15, 2020

(86) PCT No.: PCT/IB2020/053562
§ 371 (c)(1),
(2) Date: Nov. 8, 2021

(87) PCT Pub. No.: WO2020/229902
PCT Pub. Date: Nov. 19, 2020

(65) Prior Publication Data
US 2022/0229143 A1 Jul. 21, 2022

Related U.S. Application Data

(60) Provisional application No. 62/848,119, filed on May 15, 2019.

(51) Int. Cl.
*G01S 5/00* (2006.01)
*G01S 5/02* (2010.01)

(52) U.S. Cl.
CPC .......... *G01S 5/0036* (2013.01); *G01S 5/0236* (2013.01); *G01S 5/0246* (2020.05); *G01S 5/0273* (2013.01); *G01S 5/0278* (2013.01)

(58) Field of Classification Search
CPC .... G01S 5/0036; G01S 5/0236; G01S 5/0246; G01S 5/0273; G01S 5/0278; G01S 5/0218; H04L 25/0212; H04L 27/2695
See application file for complete search history.

(56) References Cited

U.S. PATENT DOCUMENTS 9,113,350 B2 8/2015 Militano et al.
2002/0196187 A1 12/2002 Hold
(Continued)

FOREIGN PATENT DOCUMENTS

EP 3306337 A1 4/2018

OTHER PUBLICATIONS

International Search Report and Written Opinion of the International Searching Authority, PCT/IB2020/053562, mailed Aug. 24, 2020, 20 pages.

*Primary Examiner* — Romani Ohri
(74) *Attorney, Agent, or Firm* — Sage Patent Group

(57) ABSTRACT

A method in a network node and a network is provided to determine line of sight, LOS, base stations for a user equipment (UE) is provided. A request is provided to at least one of the UE and a plurality of base stations to measure and report LOS detection measurements, wherein the plurality of base stations includes base stations of a serving cell of the UE. The LOS detection measurements are received from the at least one of the UE and the plurality of base stations. LOS base stations for the UE are determined based on the LOS detection measurements. An indication of the LOS base stations is transmitted to the UE.

19 Claims, 8 Drawing Sheets

(56) References Cited

U.S. PATENT DOCUMENTS

| | | | |
|---|---|---|---|
| 2005/0124368 A1* | 6/2005 | Diao | H04B 1/7113 375/E1.032 |
| 2008/0130794 A1* | 6/2008 | Chong | G01S 5/0221 375/317 |
| 2016/0249316 A1* | 8/2016 | Kudekar | G01S 5/0284 |
| 2016/0262156 A1* | 9/2016 | Yilmaz | H04W 72/541 |
| 2018/0121571 A1* | 5/2018 | Tiwari | G08B 19/00 |
| 2019/0069208 A1* | 2/2019 | Pefkianakis | H04W 84/12 |
| 2019/0223140 A1* | 7/2019 | Grossmann | G01S 5/02585 |
| 2019/0271774 A1* | 9/2019 | Zhang | G01S 13/87 |
| 2020/0088869 A1* | 3/2020 | Pefkianakis | H04W 64/006 |
| 2020/0267681 A1* | 8/2020 | Ferrari | H04B 7/02 |
| 2022/0312153 A1* | 9/2022 | Manolakos | H04W 64/00 |
| 2023/0056394 A1* | 2/2023 | Priyanto | G01S 5/0218 |
| 2023/0266425 A1* | 8/2023 | Sandgren | G01S 5/0218 342/451 |

* cited by examiner

LINE OF SIGHT DETECTION BASED ON CHANNEL IMPULSE RESPONSE REPORTED

CROSS REFERENCE TO RELATED APPLICATIONS

This application is a 35 U.S.C. § 371 national stage application of PCT International Application No. PCT/IB2020/053562 filed on Apr. 15, 2020, which in turn claims domestic priority to U.S. Provisional Patent Application No. 62/848,119, filed on May 15, 2019, the disclosures and content of which are incorporated by reference herein in their entirety.

The present disclosure relates generally to communications, and more particularly to communication methods and related devices and nodes supporting wireless communications.

Line of sight detection may be very important for many use cases. The knowledge of whether the transmitting and receiving nodes are in line of sight or not can be used for several purposes. Wireless positioning is one of the use cases as only the line of sight component of the signal can be used to estimate the distance between the transmitter and receiver which can be subsequently used in position estimation. There are not many methods available to detect if the two nodes are in LOS of each other.

An example of LOS detection may be found in U.S. Pat. No. 9,113,350B2 [reference 1]. The patent proposes the LOS detection be based on the fading statistics of the signal.

SUMMARY

There are many advantages of line of sight detection, particularly for positioning purposes. LOS information can be useful in radio resource optimization and improving positioning accuracy. In positioning line of sight is required to compute the distance between a base station and a user equipment (UE). A line of sight detection will allow a UE to select the base station(s) to perform the measurements and hence reduce the error in the measurements due to non-line of sight situations. Line of sight detection will also help the UE and the network to optimize the signaling resources for positioning.

According to some embodiments of inventive concepts, a method in a network node is provided to determine line of sight (LOS) base stations for a user equipment (UE). The method may include transmitting a request to at least one of the UE and a plurality of base stations to measure and report LOS detection measurements, wherein the plurality of base stations includes base stations of a serving cell of the UE. The method may further include receiving the LOS detection measurements from the at least one of the UE and the plurality of base stations. The method may further include determining LOS base stations for the UE based on the LOS detection measurements. The method further includes transmitting an indication of the LOS base stations to the UE.

In various other embodiments of inventive concepts, network nodes are provided that perform analogous operations.

One advantage that may be provided is that the LOS detection procedures may improve the performance of positioning. Many of the procedures described are a part of regular measurements in the network. The LOS detection procedures can be very useful for various use cases, such as positioning, beamforming, power control etc. A further advantage that may be provided is that the LOS information can be useful in optimizing the signal resources. Time and frequency resources would not be spent on the link which are in non-line-of-sight for positioning purposes, which reduces complexity and signaling load. A further advantage is that LOS information can reduce the computation complexity of time of arrival estimation algorithms, as detection of the first path may be used for time of arrival estimation.

According to some other embodiments of inventive concepts, a method in a user equipment, UE, to determine line of sight, LOS, base stations for the UE is provided. The method may include performing LOS detection measurements associated with a plurality of base stations, the LOS detection measurements including a channel impulse response. The method may further include determining at least one LOS base station based on the LOS detection measurements.

In various other embodiments of inventive concepts, wireless devices are provided that perform analogous operations.

According to some other embodiments of inventive concepts, a method in a network node to determine line of sight, LOS, base stations for a UE is provided. The method may include performing LOS detection measurements associated with the UE, the LOS detection measurements including a channel impulse response. The method may further include determining at least one LOS base station based on the LOS detection measurements.

In various other embodiments of inventive concepts, network nodes are provided that perform analogous operations.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

For positioning, the LOS detection can be done using the measurements provided by the UE to the network. These measurements can include the power delay profile of the multipath channel. In NR these measurements are being specified and the details required for LOS detection can still be specified.

It is expected that in NR the UE may report finer channel impulse response to the network. Hence, LOS detection method based on processing channel impulse response would be feasible. In the following description, LOS detection methods are described primarily using channel impulse response from the UE and also combining other possible measurements and reporting from the UE.

Figure 7:
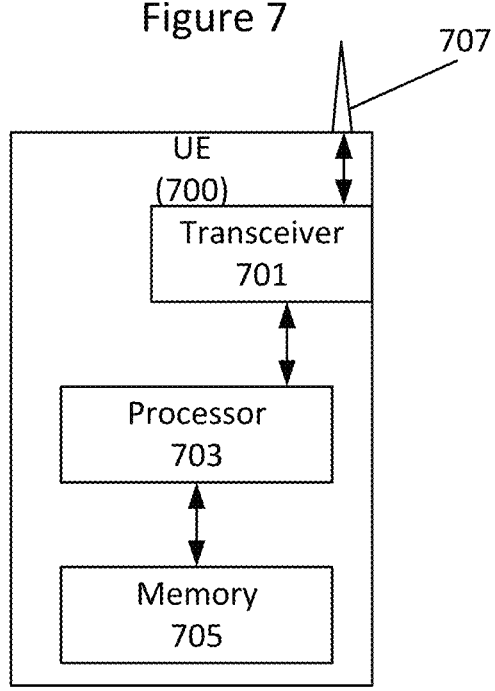
FIG. 7 is a block diagram illustrating a mobile terminal UE according to some embodiments of inventive concepts.

FIG. 7 is a block diagram illustrating elements of a UE 700 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. As shown, wireless device UE may include an antenna 707 and transceiver circuitry 701 (also referred to as a transceiver) including a transmitter and a receiver configured to provide uplink and downlink radio communications with a base station(s) of a radio access network. Wireless device UE may also include processing circuitry 703 (also referred to as a processor) coupled to the transceiver circuitry 701, and memory circuitry 705 (also referred to as memory) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that separate memory circuitry is not required. Wireless device UE may also include an interface (such as a user interface) coupled with processing circuitry 703, and/or wireless device UE may be incorporated in a vehicle.

As discussed herein, operations of the UE may be performed by processing circuitry 703 and/or transceiver circuitry 701. For example, processing circuitry 603 may control transceiver circuitry 701 to transmit communications through transceiver circuitry 701 over a radio interface to a radio access network node (also referred to as a base station) and/or to receive communications through transceiver circuitry 701 from a RAN node over a radio interface. Moreover, modules may be stored in memory circuitry 705, and these modules may provide instructions so that when instructions of a module are executed by processing circuitry 703, processing circuitry 703 performs respective operations (e.g., operations discussed below with respect to Example Embodiments relating to wireless devices).

Figure 8:
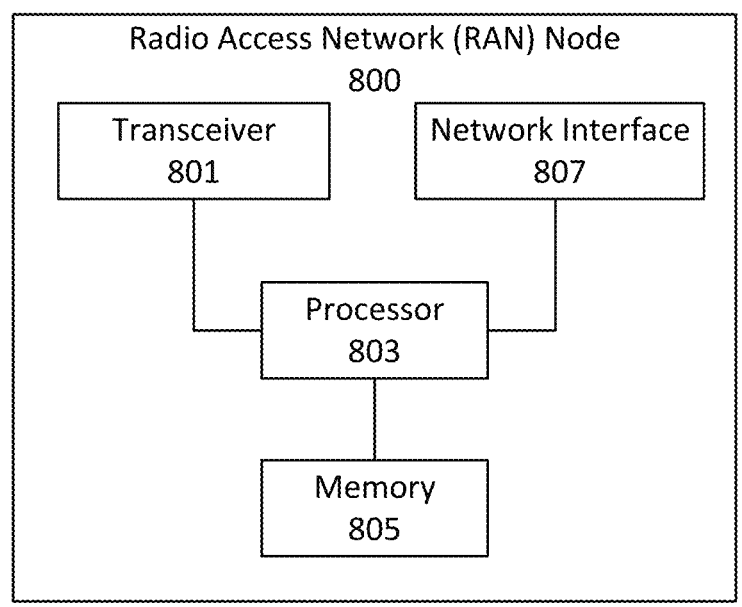
FIG. 8 is a block diagram illustrating a radio access network RAN node (e.g., a base station eNB/gNB) according to some embodiments of inventive concepts.

FIG. 8 is a block diagram illustrating elements of a radio access network RAN node 800 (also referred to as a network node, base station, eNodeB/eNB, gNodeB/gNB, etc., location network node) of a Radio Access Network (RAN) configured to provide cellular communication according to embodiments of inventive concepts. As shown, the RAN node may include transceiver circuitry 801 (also referred to as a transceiver) including a transmitter and a receiver configured to provide uplink and downlink radio communications with mobile terminals. The RAN node may include network interface circuitry 807 (also referred to as a network interface) configured to provide communications with other nodes (e.g., with other base stations) of the RAN and/or core network CN. The network node may also include a processing circuitry 803 (also referred to as a processor) coupled to the transceiver circuitry 801, and a memory circuitry 805 (also referred to as memory) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the RAN node may be performed by processing circuitry 803, network interface 807, and/or transceiver 801. For example, processing circuitry 803 may control transceiver 801 to transmit downlink communications through transceiver 801 over a radio interface to one or more mobile terminals UEs and/or to receive uplink communications through transceiver 801 from one or more mobile terminals UEs over a radio interface. Similarly, processing circuitry 803 may control network interface 807 to transmit communications through network interface 807 to one or more other network nodes and/or to receive communications through network interface from one or more other network nodes. Moreover, modules may be stored in memory 805, and these modules may provide instructions so that when instructions of a module are executed by processing circuitry 803, processing circuitry 803 performs respective operations (e.g., operations discussed below with respect to Example Embodiments relating to RAN nodes).

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 9:
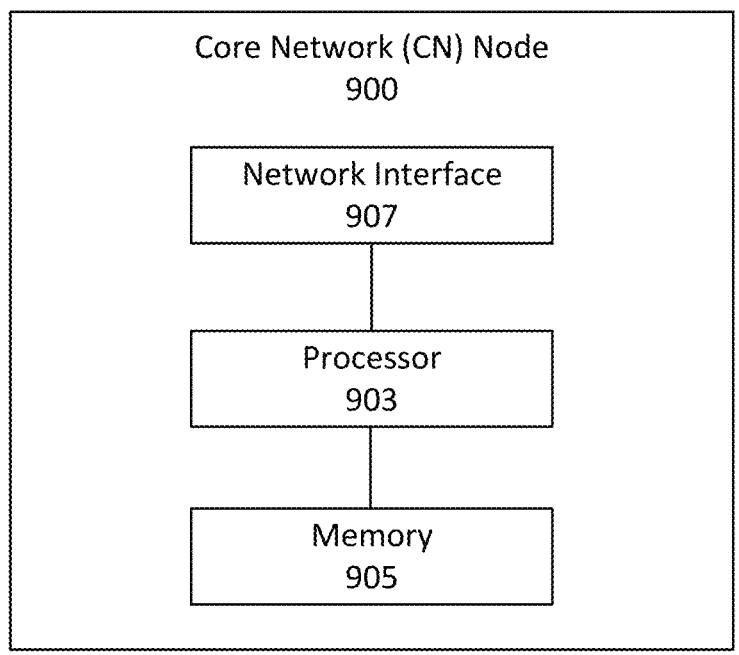
FIG. 9 is a block diagram illustrating a core network node (e.g., an AMF node, an SMF node, etc.) according to some embodiments of inventive concepts.

FIG. 9 is a block diagram illustrating elements of a core network CN node 900 (e.g., location server node, etc.) of a communication network configured to provide cellular communication according to embodiments of inventive concepts. As shown, the CN node 900 may include network interface circuitry 907 (also referred to as a network interface) configured to provide communications with other nodes of the core network and/or the radio access network RAN. The CN node may also include a processing circuitry 903 (also referred to as a processor) coupled to the network interface circuitry, and memory circuitry 905 (also referred to as memory) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the CN node may be performed by processing circuitry 903 and/or network interface circuitry 907. For example, processing circuitry 903 may control network interface circuitry 907 to transmit communications through network interface circuitry 907 to one or more other network nodes and/or to receive communications through network interface circuitry from one or more other network nodes. Moreover, modules may be stored in memory 905, and these modules may provide instructions so that when instructions of a module are executed by processing circuitry 903, processing circuitry 903 performs respective operations (e.g., operations discussed below with respect to Example Embodiments relating to core network nodes).

There are no clear methods available for LOS detection. For positioning, a UE may perform measurements with multiple base stations. The concept of positioning is based on computing the distances between base stations and the UE. When a UE and a BS base station is in non-line of sight, the unknown signal propagation delay due to non-line of sight is non-observable. If there is no way of detecting if the two nodes are in LOS or NLOS, the UE may weigh the measurements from the two scenarios equally, which may introduce large errors in the position estimation.

A multi-step procedure for detecting when any two nodes are in LOS of each other may be used. The procedure may be a collection of sub-procedures. These sub-procedures can be used in parts or can be used all together. Using more sub-procedures may increase the likelihood of accurately detecting a LOS situation. The multi-step procedure may be used in applications other than positioning, such as ultra-reliable low-latency communication (URLLC), vehicle-to everything (V2X), etc.

The line of sight (LOS) detection may appear to be a simple problem to solve. However, the LOS detection is not a simple problem to solve.

In some embodiments, the LOS detection procedure may be divided into two steps. These two steps are:
1. Collection measurements for LOS detection methods; and
2. LOS detection methods/schemes.

Collecting Measurements for LOS Detection

Channel estimation may be regularly performed for communication links. The channel estimation may be based on the transmission of known signals, reference signals, which the receiver can use to estimate the radio channel by comparing the received signal with the known transmitted signal. Different types of reference signals are specified in the wireless standards, In an OFDM-based system like LTE or 5G NR, reference signals are often distributed in time and frequency and over antenna port such that the receiver is able to estimate the radio channel $H(f, t, \Omega)$ with some granularity in time t, frequency f, and angle $\Omega$.

The channel impulse response $h(\tau)$ can be determined by the inverse Fourier transform of $H(f)$. The channel impulse response is a complex-valued function (amplitude and phase) as a function of time delay $\tau$, where $\tau$ represents the delay between the transmitted and received signal. The squared magnitude of $h(\tau)$ may be averaged over time to get the average power delay profile (PDP), $p(\tau)$. The PDP contains information on how much power reaches the receiver at different time delays. Different propagation paths show up as peaks in the PDP, where short propagation paths appear earlier than long paths.

LOS detection methods and the corresponding required measurements are provided below.

Figure 1:
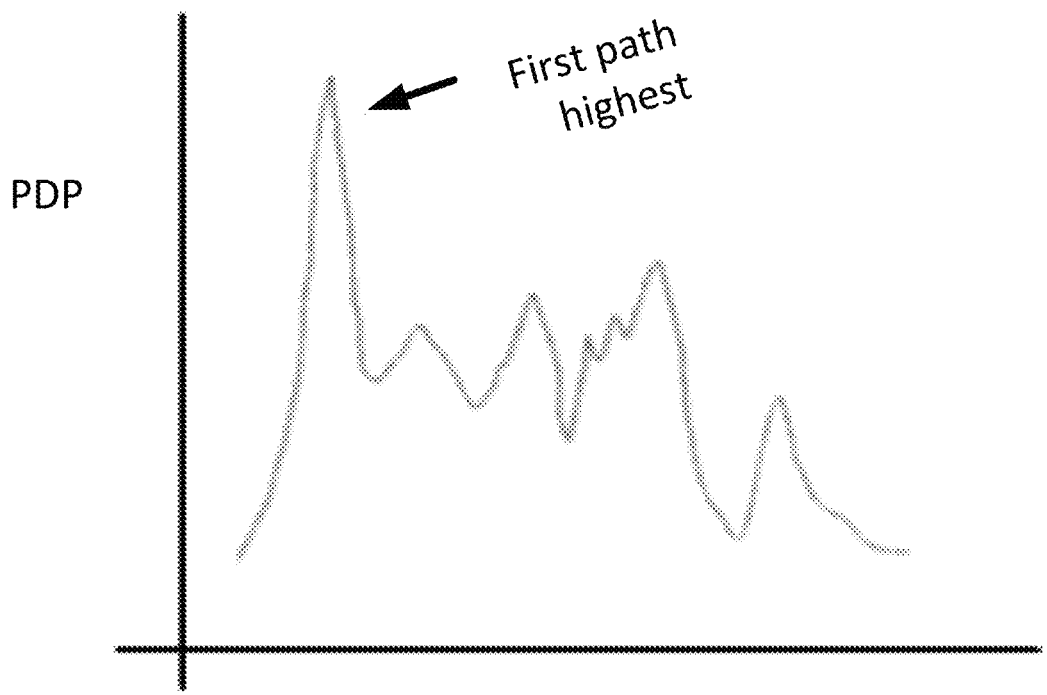
FIG. 1 is an illustration of a power delay profile (PDP) and the highest strength of the LOS path compared to other multipaths according to some embodiments of inventive concepts.

A first LOS detection method is the relative strength of the first peak relative to other later peaks. A line-of-sight path may experience attenuation due to the propagation distance (which is equal to the physical distance), while paths which are scattered or reflected in the environment experiences further attenuation due to the scattering or reflection loss and also the longer propagation distance. Furthermore, these reflected or scattered paths are always longer than the line-of-sight path and hence appear later in the PDP. Therefore, in LOS channels the first detectable path in the PDP will also be the strongest path as illustrated in FIG. 1. In other words, the first peak will be the highest peak in the estimated PDP. When the first detectable path in the estimated PDP is not the strongest, the channel may be determined to be a NLOS channel. The first detectable path in the PDP being the strongest is a good indication that the channel is a LOS channel. The measurements that may be required for this LOS detection method is the strengths of the peaks in the PDP as illustrated in FIG. 1.

In a further embodiment of the first LOS detection method, power variation of the first peak of the PDP may be used to determine whether the channel is a LOS or a NLOS channel. The power variation of a LOS channel is typically lower than the power variation of a NLOS channel.

Figure 2:
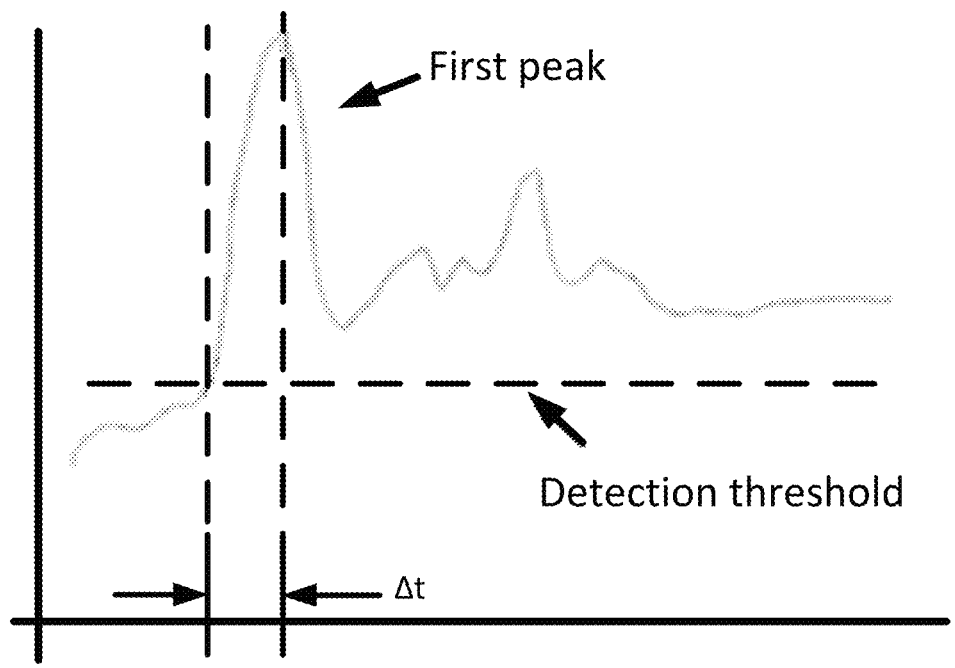
FIG. 2 is an illustration of a time difference between signal detection and arrival of the first peak of a PDP according to some embodiments of inventive concepts.

A second LOS detection method is the time difference between the signal detection and the arrival of the first peak. As can be seen in the FIG. 2, $\Delta t$ is the time difference between the signal detection and the time of arrival of the first peak. The $\Delta t$ value is usually very small for the LOS path and are larger values for NLOS paths. The measurements that may be required for this LOS detection method is the $\Delta t$ measurement.

Figure 3:
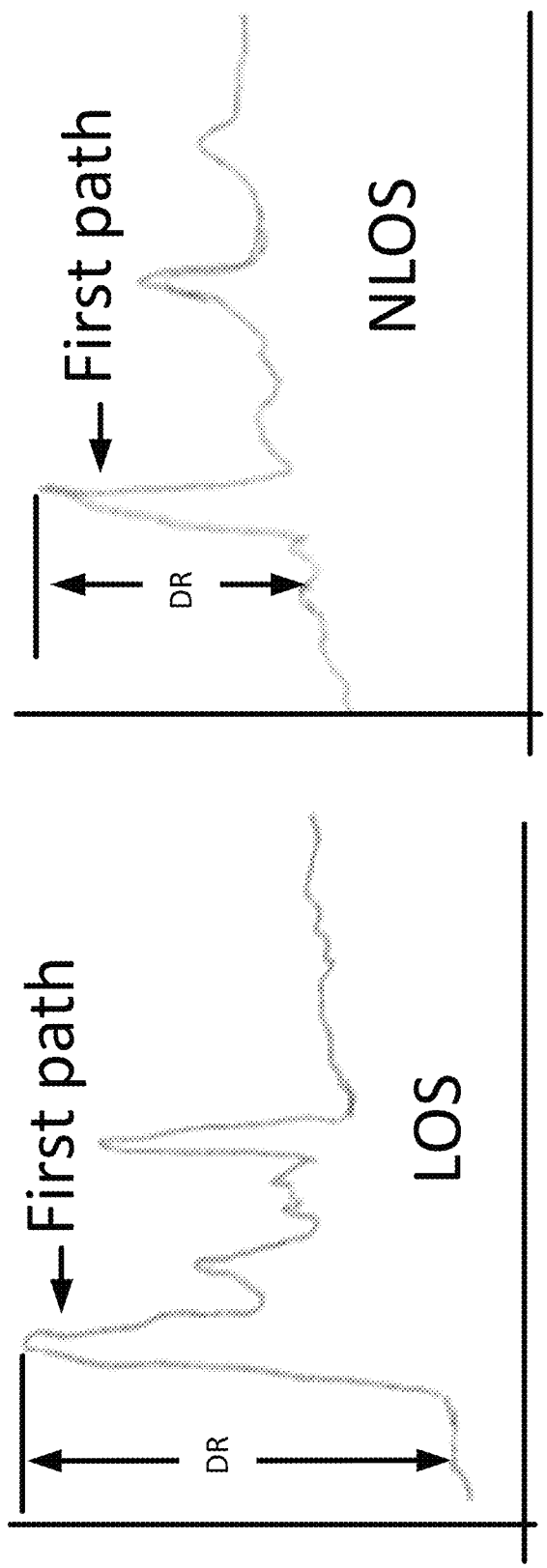
FIG. 3 is an illustration showing the dynamic range of the first peak of a PDP of a LOS path may be higher than the dynamic range of the first peak of PDP of a non-Los path according to some embodiments of inventive concepts.

Turning to FIG. 3, the third LOS detection method is the dynamic range of the first path. The dynamic range of the first peak compared with dynamic range of other peaks gives an indication of the existence of a LOS path. A higher dynamic range before the arrival of first peak compared to dynamic range of other peaks may be an indication of a LOS situation. The measurements that may be required for the third LOS detection method is the noise floor of the PDP at various intervals.

The fourth LOS detection method is the stability of the Doppler spread of the multipaths. The Doppler spread in the LOS path may be lesser than the Doppler spread in the NLOS path. The Doppler frequency is also more stable in the LOS path than in the NLOS path. The network may estimate the Doppler spread of all the peaks and may detect the LOS path from the Doppler spread. Estimating the Doppler frequency/spread may require frequent measurements and reporting from the UE to sample the Doppler frequency with at least the Nyquist rate of it. Thus, the UE should capture measurements within the coherence time to suffice the Nyquist rate of the Doppler spread. The measurements that may be required for the fourth LOS detection method is that UE should report complex impulse response with measurement/reporting rate fulfilling the Nyquist rate of the Doppler spread within coherence time.

The fifth LOS detection method is that the angle of arrival from a base station at the UE and angle of departure at the base station being within a small angle may be an indication of a LOS path. The correlation in channel models with small deviation in azimuth and elevation makes probability of LOS in an already existing LOS direction higher. This dependence can be more observable in rural areas or more open areas. Hence, this LOS detection method may be used as one of the checks to detect LOS condition. The measurements that may be required for the fifth LOS detection method is the angle of arrivals from all base stations at the UE and angle of departure at the base stations.

The sixth LOS detection method is an expected received signal strength. In a LOS path, the signal strength at the receiver will be in congruence with established models of transmission loss. For positioning purposes, the estimated position of the UE may provide the distance between BS and the UE, and hence the expected received signal strength. A LOS path may be detected when the expected received signal strength is within a designated margin from the expected signal strength. The measurements that may be required for the sixth LOS detection method are RSRP measurements at the UE.

Figure 4:
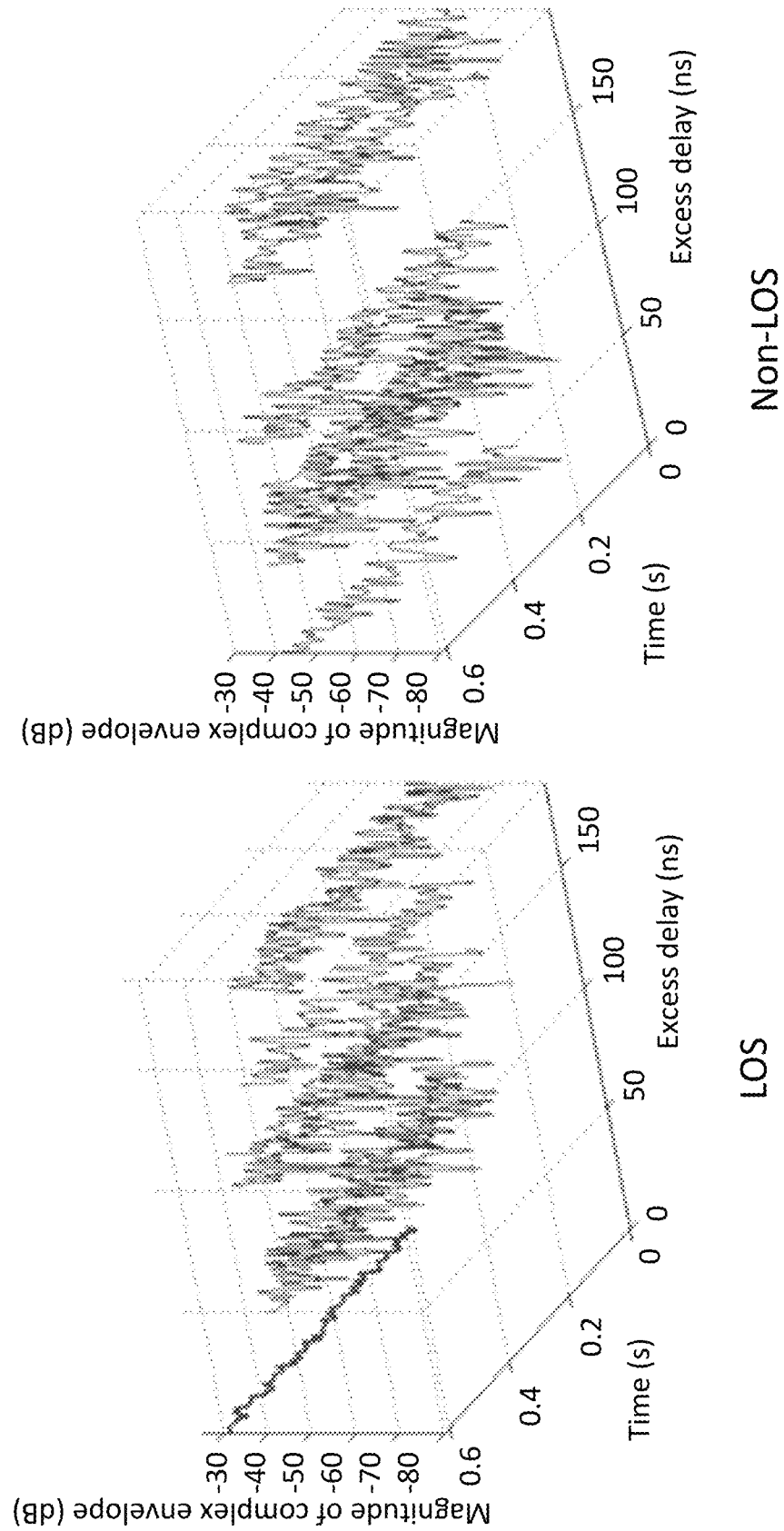
FIG. 4 is an illustration of fading statistics as seen in a channel impulse response according to some embodiments of inventive concepts.

Turning to FIG. 4, the seventh LOS detection method is a Rician distribution of the first peak and high K factor. The amplitude distribution of received signal in LOS channel has Rician distribution. In LOS scenario, the K-factor of the Rician factor can be also be high. As can be seen from the FIG. 4, the first LOS peak and first NLOS peak has different fading statistics. The first peak has Rician fading statistics than Rayleigh statistics of the NLOS channel. The LOS channel can be detected by frequent reporting of channel impulse response. The network can estimate the distribution of the first path and the K-factor of the channel impulse response. High K factor would indicate the LOS channel and the distribution of the fading whether Rician or Rayleigh would give indication of LOS or NLOS scenario. The measurements that may be required for the seventh LOS detection method are frequent and complex channel impulse response.

The eighth LOS detection method is the time variation of the TOA estimate of a candidate LOS path. When the UE is moving, the true distance to the base station (BS) may be changing gradually and in accordance with UE speed, depending on the direction of the UE with respect to the BS. In LOS conditions, the true distance to the BS is varying in the same way as the estimated TOA of the first path. However, in NLOS conditions, due to varying reflections, the estimated TOA is expected to have more time variation, because of the varying reflection conditions experienced caused by the UE movement. Thus, an estimated TOA of the first path varying in the same way as the true distance may provide an indication of a LOS path. The measurements that may be required for the eighth LOS detection method are estimations of a number of TOA of the first path over a specified time period. The specified time period may be based on the speed of the UE.

The ninth LOS detection method is using coarse UE position in connection with a 3D model to determine LOS/NLOS paths. Assuming a first coarse positioning has been estimated in some way (e.g. via dedicated positioning reference signals in a cellular network, via GNSS or in some other way), and assuming further that the network (or even UE) has access to a 3-dimensional model of the terrain and buildings, including the locations/heights of the BSs, then the network could measure, in the 3D-model, whether a particular BS has a free LOS path to a particular UE, with an assumed (coarse) location. For each BS-UE pair the network (or UE) can then determine whether a LOS exists for this pair and use this for more refined positioning. This determination may even be done iteratively, so that in a second step the position estimate is refined, compared to the first estimate. With this refined positioning estimate an even better determination of LOS or NLOS could be established for each BS-UE pair, resulting in an even better positioning estimation. In principle this process could be repeated in further iterative steps.

When the path from BS to UE is not a true LOS, the network (or UE) could use the 3D model together with a diffraction model to assess how much attenuation the shortest diffracted path is expected to experience and also the expected added delay due to the diffracted path. This information could be used to correct TOA estimates from "close-to-LOS" (small diffraction) paths. If e.g. the diffraction is due to a single roof the additional distance may easily be calculated. The measurements that may be required for the ninth LOS detection method are a positioning estimate, as derived from GNSS-based positioning or UE-based cellular network-based positioning, or measurements based on dedicated positioning reference signals.

The tenth LOS detection method is using an Artificial Neural network-based LOS discriminator. The measurements described above in the first through ninth LOS detection methods are LOS/NLOS indicators that can be used to discriminate between LOS and NLOS. Devising an algorithm which is based on the combination of measurements may make a good prediction for NLOS/LOS. One way to build such a predictor is to use an artificial neural network (e.g., a machine learning algorithm) trained with real life data.

The first step in building an artificial neural network may be collecting data for a large number of UE positions in scenarios representative of the scenarios in which the LOS discriminator will be used. The data collected may be:

- A number of LOS indicator measurements (all of the indicators described in the first through tenth LOS detection methods or a subset of them and possibly also additional complementing indicators)
- Propagation delay between the TP (i.e., transmission points (e.g., base stations)) and the UE (based on TOA estimate)
- LOS distances between the TPs and the UE (e.g. based on GPS based positioning)

The second step may be to train the neural network with the measurements. The neural network cost function could be based on if the UE was in LOS or not as based on a discrete criterion such as e.g.

$$\text{Abs}(\text{Propagation delay} - \text{LOS distance}/c)$$
$$< \text{threshold} \Rightarrow \text{LOS}$$

where c is the speed of light.

Alternatively, the neural network cost function could be based on the additional propagation delay due to NLOS (on top of the LOS propagation delay):

$$\text{NLOS-delay} = \text{Propagation\_delay} - \text{LOS\_distance}/c$$

where c is the speed of light

The third step is to use the trained neural network by the UE or the network to discriminate between LOS and NLOS. In one embodiment, the LOS measurements may be used as input for positioning.

From the collected measurements using the above described LOS detection methods, a LOS decision procedure can be followed to decide if the path is LOS or NLOS. The decision can be made sequentially using all the LOS detection methods, or by a majority of LOS detection methods or some weighted average based on priority of the LOS detection methods.

In one embodiment the LOS decision is made in the network based on measurement reports signaled by the UE to the network and/or measurements performed by the network. In an alternative embodiment the LOS decision is made by the UE based on measurements performed by the UE and/or measurement reports performed by the network and signaled by the network to the UE.

For sequential decisions using a subset of the LOS detection methods, the methods for detecting LOS can be used together to make probability of detecting LOS very high. Every LOS detection method has a probability of an accurate LOS detection measure. To achieve higher probability of LOS detection, a subset of the methods can be used sequentially. These methods can be used sequentially in order of descending probabilities, where the method providing highest probability can be used first, in order to reduce the time it takes to arrive at a final decision.

In another embodiment, the information from the LOS detection methods can be combined and a single decision can be reached based on majority decision. In other words, using the LOS detection methods or a subset of the LOS detection methods, when a majority of the LOS detection methods used indicate a path is a LOS path, then that path is designated as a LOS path. When a majority of the LOST detection methods used indicate a path is a NLOS path, then that path is designated as a NLOS path.

In a further embodiment, the LOS detection methods may be weighted. The LOS detection methods can be combined based on their expected performance in detecting LOS. The combining can be done based on inverse of their mean square error covariances of LOS detection. Other possible methods of weighted combining may be used for combining the outcome of these methods. For example, the first LOS detection method may have a 40% weight and the second through ninth LOS detection method may each have a 7 to 8% weight. Other weights may be used. When the weighted results for a path are at a specified threshold level above 50%, the path may be designated to be a LOS path.

In a further embodiment, weighting may be used as an alternative to making a LOS decision. For each TOA measurement, a weight may be calculated based on the measurements in the first through ninth LOS detection methods or a subset of these measurements. The weight may be calculated such that a higher weight corresponds to a larger probability for the TOA to be LOS. In one embodiment the weight can be an estimation of the probability for TOA measurement to be LOS.

The weight may be used together with the TOA estimates for positioning of the UE. In one embodiment positioning is performed through optimization over potential positions using a cost function which gives a smaller punishment for a TOA/RSTD to be far off (given a candidate position) when the TOA/RSTD has a smaller weight.

In an alternative embodiment the weight can be reversed so that that a higher weight corresponds to a lower probability for the TOA to be LOS, and the cost function is modified accordingly.

Figure 5:
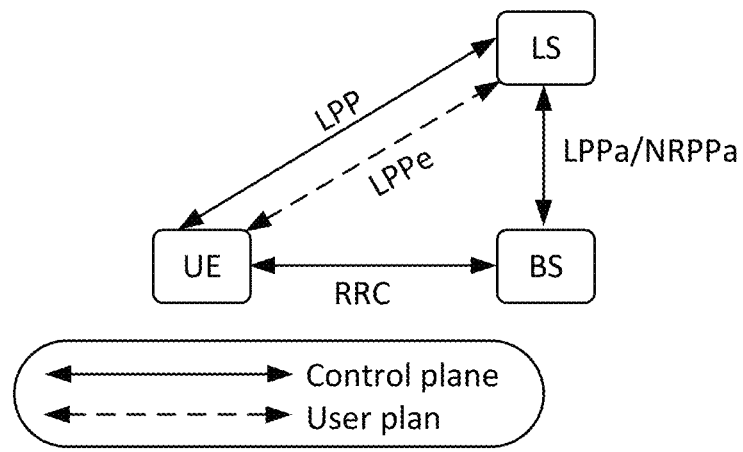
FIG. 5 is a block diagram illustrating signaling aspects of UE based LOS detection according to some embodiments of inventive concepts.

Turning to FIG. 5, the LOS detection methods described above (or a subset of the LOS detection methods) that are performed by the UE are signaled by the UE to the network. In one embodiment the LOS measurements are reported over LPP.

In another embodiment the measurements are reported over RRC to the gNB. In this embodiment the measurement reports may be further signaled to the location server over LPPa.

The results of the LOS detection methods described above (or a subset of the LOS detection methods) that are performed by the network (e.g. the gNB designated as BS in FIG. 5) are signaled by the network to the UE. In one embodiment the measurement reports are first signaled by the gNB to the location server over LPPa and next signaled from the location server to the UE over LPP. In another embodiment the measurement reports are signaled from gNB to the UE over RRC.

In one embodiment the LOS decision is performed by an artificial neural network algorithm or other type of machine learning algorithm in the UE. In one embodiment the network programs the neural network (or machine learning mechanism) through signaling. This signaling is done via LPPe and may contain connection weights and connection bias for the neuron connections in the neural network. Alternatively, the signaling may contain code describing the machine learning algorithm to use.

Figure 6:
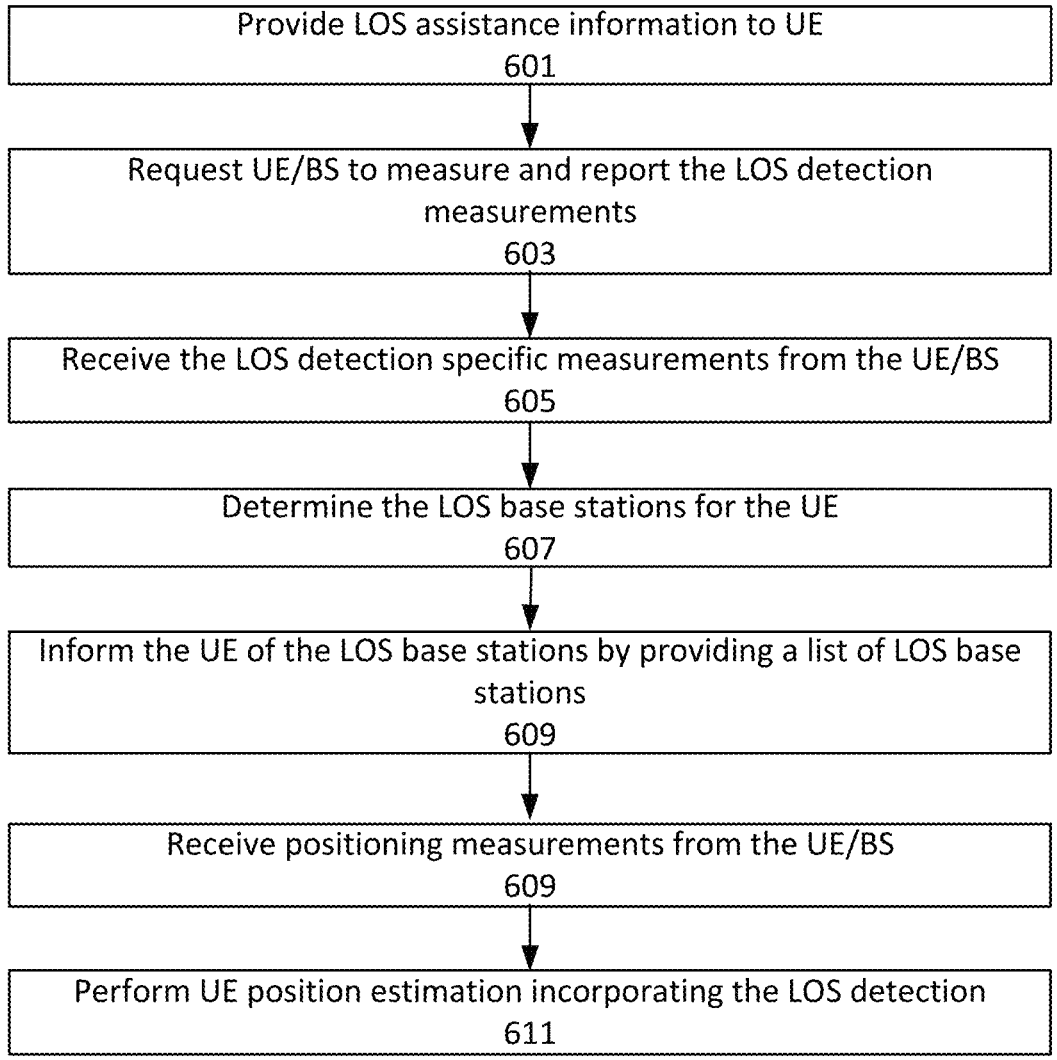
FIG. 6 is a flow chart illustrating a positioning procedure from the perspective of a network node having location server functionality according to some embodiments of inventive concepts.

Turning to FIG. 6, operations the location server perform will now be discussed according to some embodiments of inventive concepts. The location server may be a core network node (e.g., core network node 900) or a RAN network node (e.g., network node 800). Operations of a RAN node 900 (implemented using the structure of FIG. 9) will be used to discuss the flow chart of FIG. 6 according to some embodiments of inventive concepts. For example, modules may be stored in memory 805 of FIG. 8, and these modules may provide instructions so that when the instructions of a module are executed by respective RAN node processing circuitry 803, processing circuitry 803 performs respective operations of the flow chart. The operations may also be performed by processing circuitry 903 of core network node 900.

In operation 601, processing circuitry 803 may provide LOS assistance information to the UE (i.e., wireless device 700). The LOS assistance information may include information enabling the UE to perform measurements. For example, the LOS assistance information may include when to perform measurements, which LOS detection methods to use (e.g., all of the LOS detection methods or a subset of the LOS detection methods), which base stations to perform measurements on, etc.

In operation 603, the processing circuitry 803 may transmit, via transceiver circuitry 801, a request to at least one of the UE and a plurality of base stations to measure and report LOS detection measurements, wherein the plurality of base stations includes base stations of a serving cell of the UE. The request may specify which LOS detection methods are to be used in measuring and reporting the LOS detection measurement, which of the UE or base station is to use a LOS detection method, etc. For example, the request may specify that the UE is to perform all of the LOS measurements, a subset of the LOS measurements, or none of the LOS measurements. The LOS detection methods may be any of the first LOS detection method through the ninth LOS detection method. The request may be periodically sent so that LOS detection measurements are performed periodically. For example, as the UE moves, a base station that was determined to be a LOS base station may no longer be a LOS base station. Periodically performing the LOS detection measurements will ensure that LOS base stations can be detected as the UE moves.

In operation 605, the processing circuitry 803 may receive, via transceiver circuitry 801, the LOS detection measurements from the the at least one of the UE and the plurality of base stations. In operation 607, the processing circuitry 803 may determine LOS base stations for the UE based on the LOS detection methods. For example, if the first peak of the PDP is higher than the rest of the peaks of the PDP, then the base station associated with the PDP is likely to be a LOS base station. The determination may use other LOS detection measurements to determine that the base station associated with the PDP is likely to be a LOS base station.

The determination of LOS base stations may be determined based on sequentially using the LOS detection measurements, or a subset of LOS detection methods, in order of descending probabilities, wherein a LOS detection measurement having highest probability is used first, weighting the LOS detection measurements based on probability of LOS detection, and/or based on whether a majority of the LOS detection measurements for the base station indicate the base station is a LOS base station.

The determination of LOS base stations may also use a 3-dimensional model by accessing a 3-dimensional model of terrain and buildings including a location of each of the plurality of base stations and determining, for each base station of the plurality of base stations, whether a LOS exists between the base station and the UE using the 3-dimensional model of terrain and buildings, an estimate of a position of the UE, and a location of the base station.

In operation 609, the processing circuitry 803 may transmit, via transceiver circuitry 801, an indication of the LOS base stations to the UE. The indication may specify which of the plurality of base stations is a LOS base station for the current position of the UE.

In operation 611, the processing circuitry 803 may receive, via transceiver circuitry 801, positioning measurements from the at least one of the UE and the plurality of base stations. The positioning measurements may include measurements from the LOS detection measurements. In operation 613, the processing circuitry 803 may perform UE position estimation using results of the LOS detection measurements and the positioning measurements.

Various operations from the flow chart of FIG. 6 may be optional with respect to some embodiments of RAN nodes and related methods. Regarding methods of determining LOS base stations (set forth below), for example, operations of blocks 609 and 611 of FIG. 6 may be optional.

Operations of the user equipment 700 (implemented using the structure of the block diagram of FIG. 7) will now be discussed with reference to the flow chart of FIG. 10 according to some embodiments of inventive concepts. For example, modules may be stored in memory 705 of FIG. 7, and these modules may provide instructions so that when the instructions of a module are executed by respective wireless device processing circuitry 703, processing circuitry 703 performs respective operations of the flow chart.

In operation 1001, the processing circuitry 703 may, via transceiver circuitry 701, receive a request from a network node to measure and report the LOS detection measurements for a plurality of base stations. In operation 1003, the processing circuitry 703 may receive, via transceiver circuitry 701 from a network node, LOS decision assistance information. The LOS assistance information may include information enabling the UE to perform measurements. For example, the LOS assistance information may include when to perform measurements, which LOS detection methods to use (e.g., all of the LOS detection methods or a subset of the LOS detection methods), which base stations to perform measurements on, etc.

In operation 1005, the processing circuitry 703 may perform LOS detection measurements associated with the plurality of base stations. The processing circuitry 703 may decide which of the LOS detection methods described above are to be performed in one embodiment. The LOS detection methods may include all or a subset of the LOS detection methods described above. In other embodiments, the LOS detection methods to be performed are specified in the LOS assistance information. The LOS detection measurements may be performed periodically. For example, as the UE moves, a base station that was determined to be a LOS base station may no longer be a LOS base station. Periodically performing the LOS detection measurements will ensure that LOS base stations can be detected as the UE moves. The LOS detection methods specified may include all or a subset of the LOS detection methods described above. For example, the LOS detection methods may be a channel impulse response at the UE, a time difference between signal detection and a time of arrival of a first peak of a power delay profile, PDP, of the channel impulse response, a relative strength of the first peak compared to later peaks of the PDP wherein the relative strength comprises one of a power variation and a signal magnitude, a dynamic range of the first peak of the PDP, a stability of an estimated Doppler spread of peaks of the PDP, an angle of arrivals from base stations of the neighboring base stations and a serving cell of the UE and angle of departure at the base stations of the serving cell, a time variation of a number of time of arrivals from the base stations of the neighboring base stations and the serving cell base station over a time period, and/or a received signal strength being within a margin of an expected received signal strength In operation 1007, the processing circuitry 703 may transmit, via transceiver circuitry 701, results of the LOS detection measurements towards the network node. In operation 1009, the processing circuitry 703 may determine at least one LOS base station based on the LOS detection measurements. The determination of the at least one LOS base station may be determined based on sequentially using the LOS detection measurements, or a subset of LOS detection methods, in order of descending probabilities, wherein a LOS detection measurement having highest probability is used first, weighting the LOS detection measurements based on probability of LOS detection, and/or based on whether a majority of the LOS detection measurements for the base station indicate the base station is a LOS base station.

The determination may also be based on LOS decision assistance information. The LOS decision assistance information may include information enabling the UE to perform measurements. The LOS decision assistance information may also include a list of LOS detection methods to perform.

The determination of at least one LOS base stations may also use a 3-dimensional model by accessing a 3-dimensional model of terrain and buildings including a location of each of the plurality of base stations and determining, for each base station of the plurality of base stations, whether a LOS exists between the base station and the UE using the 3-dimensional model of terrain and buildings, an estimate of a position of the UE, and a location of the base station In operation 1011, the processing circuitry 703 may perform positioning measurements. The positioning measurements may include measurements from the LOS detection measurements. In operation 1013, the processing circuitry 703 may estimate a position of the UE using results of the LOS detection measurements and the positioning measurements. In operation 1015, the processing circuitry 703 may selection at least one base station for communication based on the at least one LOS detection measurement.

Figure 10:
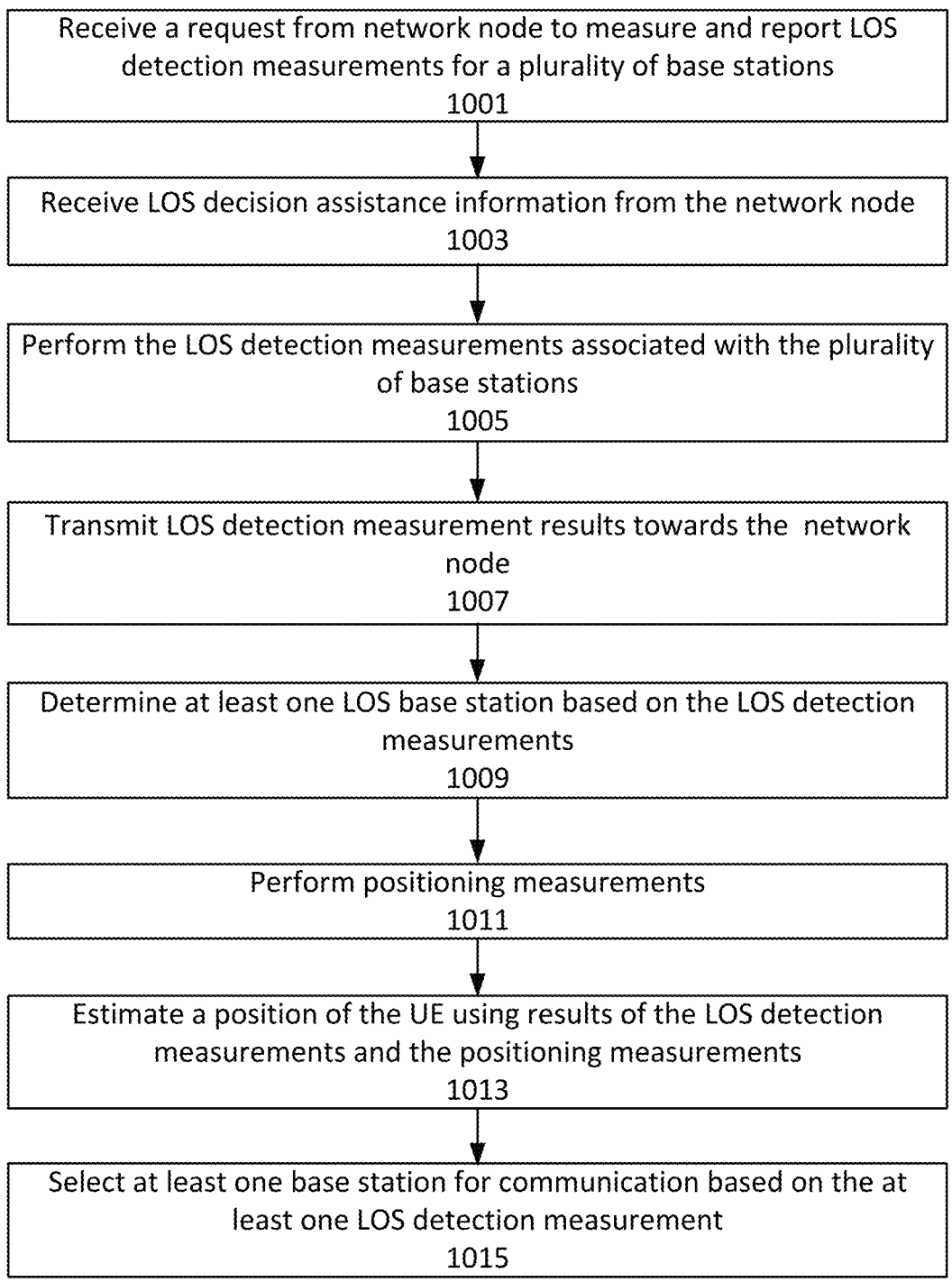
FIG. 10 is a flow chart illustrating operations of a user equipment according to some embodiments of inventive concepts.

Various operations from the flow chart of FIG. 10 may be optional with respect to some embodiments of user equipment devices and related methods. For example, operations of blocks 1001, 1005, 1009, 1011, 1013, and 1015 of FIG. 10 may be optional.

Operations of a base station 800 (implemented using the structure of the block diagram of FIG. 8) will now be discussed with reference to the flow chart of FIG. 11 according to some embodiments of inventive concepts. For example, modules may be stored in memory 805 of FIG. 8, and these modules may provide instructions so that when the instructions of a module are executed by respective wireless device processing circuitry 803, processing circuitry 803 performs respective operations of the flow chart.

In operation 1101, the processing circuitry 803 may, via transceiver circuitry 801, receive a request to measure and report LOS detection measurements associated with a UE from a location server.

In operation 1103, the processing circuitry 803 may perform LOS detection measurements associated with the UE. The processing circuitry 803 may decide which of the LOS detection methods described above are to be performed in one embodiment. The LOS detection methods may include all or a subset of the LOS detection methods described above. For example, the LOS detection methods may be a channel impulse response at the UE, a time difference between signal detection and a time of arrival of a first peak of a power delay profile, PDP, of the channel impulse response, a relative strength of the first peak compared to later peaks of the PDP wherein the relative strength comprises one of a power variation and a signal magnitude, a dynamic range of the first peak of the PDP, a stability of an estimated Doppler spread of peaks of the PDP, an angle of arrivals from base stations of the neighboring base stations and a serving cell of the UE and angle of departure at the base stations of the serving cell, a time variation of a number of time of arrivals from the base stations of the neighboring base stations and the serving cell base station over a time period, and/or a received signal strength being within a margin of an expected received signal strength. The LOS detection measurements may be performed periodically. For example, as the UE moves, a base station that was determined to be a LOS base station may no longer be a LOS base station. Periodically performing the LOS detection measurements will ensure that LOS base stations can be detected as the UE moves.

In operation 1105, the processing circuitry 803 may transmit, via transceiver circuitry 801, results of the LOS detection measurements towards the location server. In operation 1107, the processing circuitry 803 may determine at least one LOS base station based on the LOS detection measurements. The determination of the at least one LOS base station may be determined based on sequentially using the LOS detection measurements, or a subset of LOS detection methods, in order of descending probabilities, wherein a LOS detection measurement having highest probability is used first, weighting the LOS detection measurements based on probability of LOS detection, and/or based on whether a majority of the LOS detection measurements for the base station indicate the base station is a LOS base station.

The determination may also be based on LOS decision assistance information. The LOS decision assistance information may include information enabling the UE to perform measurements. The LOS decision assistance information may also include a list of LOS detection methods to perform.

The determination of at least one LOS base stations may also use a 3-dimensional model by accessing a 3-dimensional model of terrain and buildings including a location of each of the plurality of base stations and determining, for each base station of the plurality of base stations, whether a LOS exists between the base station and the UE using the 3-dimensional model of terrain and buildings, an estimate of a position of the UE, and a location of the base station In operation 1109, the processing circuitry 803 may perform positioning measurements. The positioning measurements may include measurements from the LOS detection measurements. In operation 1111, the processing circuitry 803 may estimate a position of the UE using results of the LOS detection measurements and the positioning measurements. In operation 1113, the processing circuitry 803 may select at least one base station for the UE to communicate based on the at least one LOS detection measurement.

Figure 11:
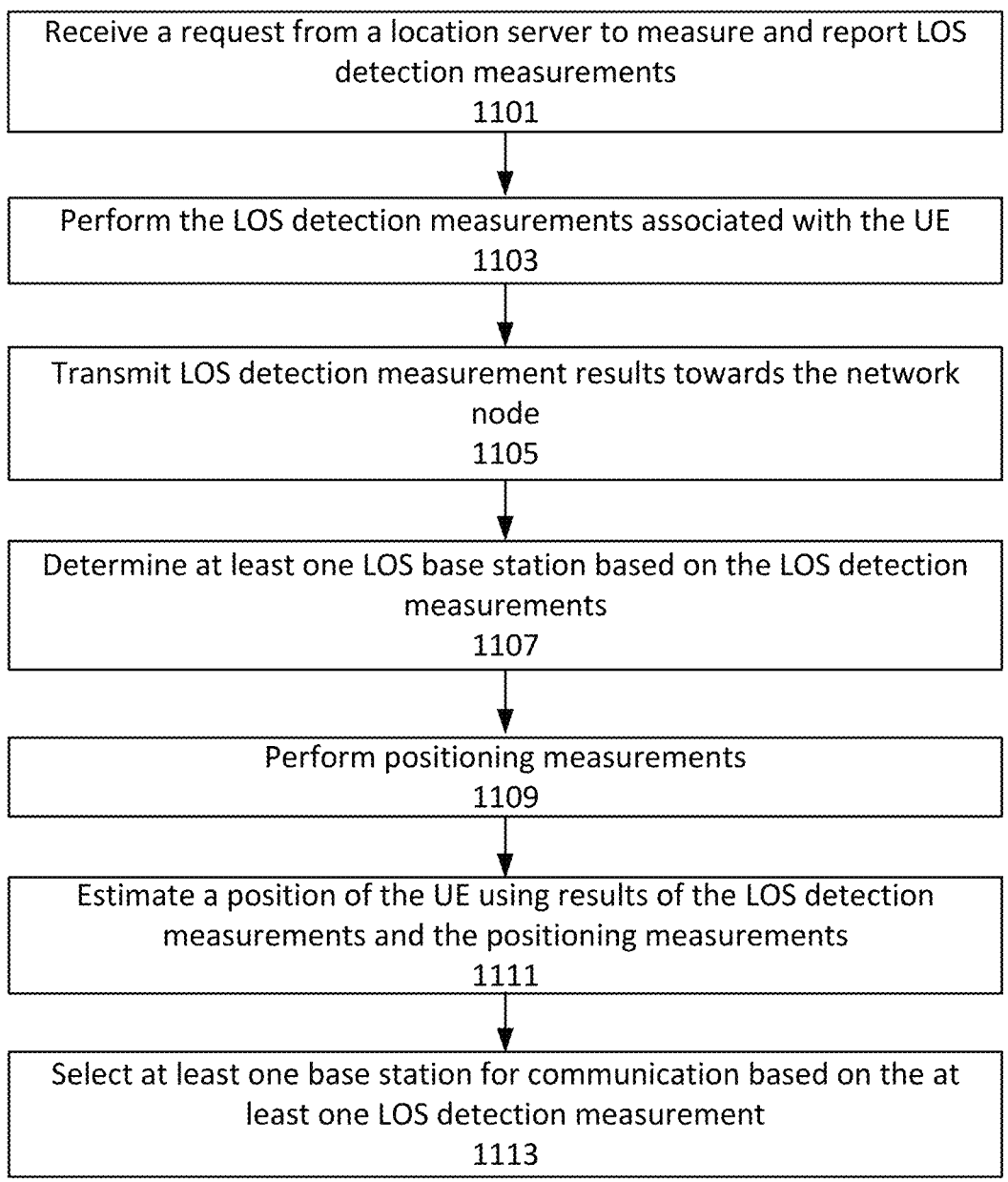
FIG. 11 is a flow chart illustrating operations of a network node according to some embodiments of inventive concepts.

Various operations from the flow chart of FIG. 11 may be optional with respect to some embodiments of user equipment devices and related methods. For example, operations of blocks 1101, 1105, 1109, 1111, and 1113 of FIG. 11 may be optional.

Example embodiments are discussed below.

1. A method in a network node (800, 900) to determine line of sight, LOS, base stations for a user equipment, UE, (700) the method comprising:
   transmitting (603) a request to at least one of the UE and a plurality of base stations to measure and report LOS detection measurements, wherein the plurality of base stations includes base stations of a serving cell of the UE;
   receiving (605) the LOS detection measurements from the at least one of the UE and the plurality of base stations;
   determining (607) LOS base stations for the UE based on the LOS detection measurements;
   transmitting (609) an indication of the LOS base stations to the UE (700).

2. The method of Embodiment 1 wherein the network node is a core network node.

3. The method of any of Embodiments 1-2 further comprising:
   providing (601) LOS assistance information to the UE.

4. The method of any of Embodiments 1-3, further comprising:
   receiving (611) positioning measurements from the at least one of the UE and the plurality of base stations;
   performing (613) UE position estimation using results of the LOS detection measurements and the positioning measurements.

5. The method of any of Embodiments 1-4 wherein the at least one of the UE and the plurality of base stations comprises the UE.

6. The method of any of Embodiments 1-4 wherein the at least one of the UE and the plurality of base stations comprises the plurality of base stations.

7. The method of any of Embodiments 1-6, further comprising:
accessing a 3-dimensional model of terrain and buildings including a location of each of the plurality of base stations; and determining, for each base station of the plurality of base stations, whether a LOS exists between the base station and the UE using the 3-dimensional model of terrain and buildings, an estimate of a position of the UE, and a location of the base station.

8. The method of any of Embodiments 1-7 wherein determining the LOS base stations based on the LOS detection measurements comprises determining the LOS base stations based on sequentially using the LOS detection measurements in order of descending probabilities, wherein a LOS detection measurement having highest probability is used first.

9. The method of any of Embodiments 1-7 wherein determining the LOS base stations based on the LOS detection measurements comprises weighting the LOS detection measurements based on probability of LOS detection.

10. The method of any of Embodiments 1-7 wherein determining the LOS base stations based on the LOS detection measurements comprises combining the LOS detection and determining if a base station is a LOS base station based on whether a majority of the LOS detection measurements for the base station indicate the base station is a LOS base station.

11. A network node (800, 900) configured to operate in a communication network, the CN node comprising:
processing circuitry (803, 903); and memory (805, 905) coupled with the processing circuitry, wherein the memory includes instructions that when executed by the processing circuitry causes the network node to perform operations according to any of Embodiments 1-10.

12. A network node (800, 900) configured to operate in a communication network, wherein the network node is adapted to perform according to any of Embodiments 1-10.

13. A computer program comprising program code to be executed by processing circuitry (803, 903) of a network node (800, 900) configured to operate in a communication network, whereby execution of the program code causes the network node (800, 900) to perform operations according to any of embodiments 1-10.

14. A computer program product comprising a non-transitory storage medium including program code to be executed by processing circuitry (803, 903) of a network node (800, 900) configured to operate in a communication network, whereby execution of the program code causes the network node (800, 900) to perform operations according to any of embodiments 1-10.

15. A method in a user equipment, UE, (700) to determine line of sight, LOS, base stations for the UE, the method comprising:
performing (1005) LOS detection measurements associated with a plurality of base stations, the LOS detection measurements including a channel impulse response; and determining (1009) at least one LOS base station based on the LOS detection measurements.

16. The method of Embodiment 15, further comprising:
receiving (1001) a request from a network node to measure and report the LOS detection measurements for the plurality of base stations;
transmitting (1007) results of the LOS detection measurements towards the network node; and
wherein determining the at least one LOS base station further comprises receiving an indication of the LOS base station from the network node.

17. The method of any of Embodiments 15-16 further comprising:
receiving (1003) from a network node, LOS decision assistance information, and
wherein determining the at least one LOS base station based on the LOS detection measurements comprises determining the at least one LOS base station based on the LOS detection measurements and on the LOS decision assistance information.

18. The method of Embodiment 17 wherein the LOS decision assistance information comprises information enabling the UE to perform measurements.

19. The method of Embodiment 18 wherein the LOS decision assistance information further comprises a list of LOS detection methods to perform.

20. The method of any of Embodiments 15-19, wherein the LOS detection measurements comprises:
the channel impulse response at the UE; and
at least one LOS detection measurement method.

21. The method of Embodiment 20 wherein the at least one LOS detection measurement method comprises a time difference between signal detection and a time of arrival of a first peak of a power delay profile, PDP, of the channel impulse response.

22. The method of any of Embodiments 20-21 wherein the plurality of LOS detection measurement methods further comprises a relative strength of the first peak compared to later peaks of the PDP.

23. The method of Embodiment 22 wherein the relative strength comprises one of a power variation and a signal magnitude.

24. The method of any of Embodiments 20-23 wherein the plurality of LOS detection measurement methods further comprises a dynamic range of the first peak of the PDP.

25. The method of any of Embodiments 20-24, wherein the plurality of LOS detection measurement methods further comprises a stability of an estimated Doppler spread of peaks of the PDP.

26. The method of any of Embodiments 20-25, wherein the plurality of LOS detection measurement methods further comprises an angle of arrivals from base stations of the neighboring base stations and a serving cell of the UE and angle of departure at the base stations of the serving cell.

27. The method of any of Embodiments 20-26, wherein the plurality of LOS detection measurement methods further comprises a time variation of a number of time of arrivals from the base stations of the neighboring base stations and the serving cell base station over a time period.

28. The method of any of Embodiments 20-27, wherein the plurality of LOS detection measurement methods further comprises a received signal strength being within a margin of an expected received signal strength.

29. The method of any of Embodiments 15-28, further comprising:
performing (1011) positioning measurements;
estimating (1013) a position of the UE using results of the LOS detection measurements and the positioning measurements.

30. The method of any of Embodiments 15-29, further comprising:
accessing a 3-dimensional model of terrain and buildings including a location of each of the neighboring base stations; and determining, for each base station of the plurality of base stations, whether a LOS exists between the base station and the UE using the 3-dimensional model of terrain and buildings, an estimate of a position of the UE and a location of the base station of the plurality of base stations.

31. The method of any of Embodiments 15-30, further comprising:
selecting (1015) at least one base station for communication based on the at least one LOS detection measurement.

32. The method of any of Embodiments 15-31 wherein determining the LOS base stations based on the LOS detection measurements comprises determining the LOS base stations based on sequentially using the LOS detection measurements in order of descending probabilities, wherein a LOS detection measurement having highest probability is used first.

33. The method of any of Embodiments 15-31 wherein determining the LOS base stations based on the LOS detection measurements comprises weighting the LOS detection measurements based on probability of LOS detection.

34. The method of any of Embodiments 15-31 wherein determining the LOS base stations based on the LOS detection measurements comprises combining the LOS detection and determining if a base station is a LOS base station based on whether a majority of the LOS detection measurements for the base station indicate the base station is a LOS base station.

35. A wireless device (700) configured to operate in a communication network, the wireless device comprising:
processing circuitry (703); and
memory (705) coupled with the processing circuitry, wherein the memory includes instructions that when executed by the processing circuitry causes the wireless device to perform operations according to any of Embodiments 15-34.

36. A wireless device (700) configured to operate in a communication network, wherein the wireless device is adapted to perform according to any of Embodiments 15-34.

37. A computer program comprising program code to be executed by processing circuitry (703) of a wireless device (700) configured to operate in a communication network, whereby execution of the program code causes the wireless device (700) to perform operations according to any of embodiments 15-34.

38. A computer program product comprising a non-transitory storage medium including program code to be executed by processing circuitry (703) of a wireless device (700) configured to operate in a communication network, whereby execution of the program code causes the wireless device (700) to perform operations according to any of embodiments 15-34.

39. A method in a network node to determine line of sight, LOS, base stations for the UE, the method comprising:
performing (1103) LOS detection measurements associated with the UE, the LOS detection measurements including a channel impulse response; and
determining (1107) at least one LOS base station based on the LOS detection measurements.

40. The method of Embodiment 39, further comprising:
receiving (1101) a request to measure and report the LOS detection measurements from a location server;
transmitting (1105) results of the LOS detection measurements towards the location server; and wherein determining the at least one LOS base station further comprises receiving an indication of the LOS base station from the network node.

41. The method of any of Embodiments 39-40, wherein the LOS detection measurements comprises:
the channel impulse response from the UE; and
at least one LOS detection measurement method.

42. The method of Embodiment 41 wherein the at least one LOS detection measurement method comprises a time difference between signal detection and a time of arrival of a first peak of a power delay profile, PDP, of the channel impulse response.

43. The method of any of Embodiments 41-42 wherein the plurality of LOS detection measurement methods further comprises a relative strength of the first peak compared to later peaks of the PDP.

44. The method of Embodiment 43 wherein the relative strength comprises one of a power variation and a signal magnitude.

45. The method of any of Embodiments 41-44 wherein the plurality of LOS detection measurement methods further comprises a dynamic range of the first peak of the PDP.

46. The method of any of Embodiments 41-45, wherein the plurality of LOS detection measurement methods further comprises a stability of an estimated Doppler spread of peaks of the PDP.

47. The method of any of Embodiments 41-46, wherein the plurality of LOS detection measurement methods further comprises an angle of arrivals from base stations of the neighboring base stations and a serving cell of the UE and angle of departure at the base stations of the serving cell.

48. The method of any of Embodiments 41-47, wherein the plurality of LOS detection measurement methods further comprises a time variation of a number of time of arrivals from the base stations of the neighboring base stations and the serving cell base station over a time period.

49. The method of any of Embodiments 41-48, wherein the plurality of LOS detection measurement methods further comprises a received signal strength being within a margin of an expected received signal strength.

50. The method of any of Embodiments 39-49, further comprising:
performing (1109) positioning measurements;
estimating (1111) a position of the UE using results of the LOS detection measurements and the positioning measurements.

51. The method of any of Embodiments 39-50, further comprising:
accessing a 3-dimensional model of terrain and buildings including a location of each of the neighboring base stations; and
determining, for each base station of the neighboring base stations, whether a LOS exists between the base station of the neighboring base stations and the UE using the 3-dimensional model of terrain and buildings, an estimate of a position of the UE and a location of the base station of the neighboring base stations.

52. The method of any of Embodiments 39-51, further comprising:
selecting (1113) at least one base station for the UE to communicate based on the at least one LOS detection measurement.

53. The method of any of Embodiments 39-52 wherein determining the LOS base stations based on the LOS detection measurements comprises determining the LOS base stations based on sequentially using the LOS detection measurements in order of descending probabilities, wherein a LOS detection measurement having highest probability is used first.

54. The method of any of Embodiments 39-52 wherein determining the LOS base stations based on the LOS detection measurements comprises weighting the LOS detection measurements based on probability of LOS detection.

55. The method of any of Embodiments 39-52 wherein determining the LOS base stations based on the LOS detection measurements comprises combining the LOS detection and determining if a base station is a LOS base station based on whether a majority of the LOS detection measurements for the base station indicate the base station is a LOS base station.

56. A network node (800) configured to operate in a communication network, the network node comprising:
processing circuitry (803); and
memory (805) coupled with the processing circuitry, wherein the memory includes instructions that when executed by the processing circuitry causes the network node to perform operations according to any of Embodiments 39-55.

57. A network node (800) configured to operate in a communication network, wherein the network node is adapted to perform according to any of Embodiments 39-55.

58. A computer program comprising program code to be executed by processing circuitry (803) of a network node (800) configured to operate in a communication network, whereby execution of the program code causes the network node (800) to perform operations according to any of embodiments 39-55.

59. A computer program product comprising a non-transitory storage medium including program code to be executed by processing circuitry (803) of a network node (800) configured to operate in a communication network, whereby execution of the program code causes the network node (800) to perform operations according to any of embodiments 39-55.

Explanations are provided below for various abbreviations/acronyms used in the present disclosure.

| Abbreviation | Explanation |
| --- | --- |
| BS | Base Station |
| LOS | Line of Sight |
| UE | User Equipment |
| NLOS | Non-Line of Sight |
| NR | New Radio |
| NRPP | New Radio Positioning Protocol |
| NRPPa | New Radio Positioning Protocol A |
| PDP | Power Delay Profile |
| RSTD | Reference Signal Time Difference |
| TDOA | Time Difference of Arrival |
| ToA or TOA | Time of Arrival |

References are identified below.
[1] U.S. Pat. No. 9,113,350
Additional explanation is provided below.
Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method in a network node to determine line of sight (LOS) (LOS) base stations for a user equipment (UE) the method comprising:
    transmitting a request to at least one of the UE and a plurality of base stations to measure and report LOS detection measurements, wherein the plurality of base stations includes base stations of a serving cell of the UE;
    receiving the LOS detection measurements from the at least one of the UE and the plurality of base stations, wherein the LOS detection measurements includes a channel impulse response and further includes:
        a relative strength of a first peak of a power delay profile (PDP) of the channel impulse response, wherein the PDP represents received signal power as a function of time delay, wherein the relative strength of the first peak is determined by comparing the power of a first arriving peak to the power of subsequent peaks of the PDP; and/or
        a dynamic range of the first peak of the PDP, wherein the dynamic range is the difference in power between the first peak and a noise floor of the PDP;
    determining LOS base stations for the UE based on the LOS detection measurements; and
    transmitting an indication of the LOS base stations to the UE.

2. The method of claim 1, further comprising:
    providing LOS assistance information to the UE.

3. The method of claim 1, further comprising:
    receiving positioning measurements from the at least one of the UE and the plurality of base stations; and
    performing UE position estimation using results of the LOS detection measurements and the positioning measurements.

4. The method of claim 1, wherein the at least one of the UE and the plurality of base stations comprises the UE.

5. The method of any of claim 1, wherein the at least one of the UE and the plurality of base stations comprises the plurality of base stations.

6. The method of claim 1, further comprising:
accessing a 3-dimensional model of terrain and buildings including a location of each of the plurality of base stations; and
determining, for each base station of the plurality of base stations, whether a LOS exists between the base station and the UE using the 3-dimensional model of terrain and buildings, an estimate of a position of the UE, and a location of the base station.

7. The method of claim 1, wherein determining the LOS base stations based on the LOS detection measurements comprises determining the LOS base stations based on sequentially using the LOS detection measurements in order of descending probabilities, wherein a LOS detection measurement having highest probability is used first.

8. The method of claim 1, wherein determining the LOS base stations based on the LOS detection measurements comprises weighting the LOS detection measurements based on probability of LOS detection.

9. The method of claim 1, wherein determining the LOS base stations based on the LOS detection measurements comprises combining the LOS detection and determining if a base station is a LOS base station based on whether a majority of the LOS detection measurements for the base station indicate the base station is a LOS base station.

10. A network node configured to operate in a communication network, the CN node comprising:
processing circuitry; and
memory coupled with the processing circuitry, wherein the memory includes instructions that when executed by the processing circuitry causes the network node to perform operations according to claim 1.

11. A method in a user equipment (UE) to determine line of sight (LOS) base stations for the UE, the method comprising:
performing LOS detection measurements associated with a plurality of base stations, the LOS detection measurements including a channel impulse response and further including:
a relative strength of a first peak of a power delay profile (PDP) of the channel impulse response, wherein the PDP represents received signal power as a function of time delay, wherein the relative strength of the first peak is determined by comparing the power of a first arriving peak to the power of subsequent peaks of the PDP; and/or
a dynamic range of the first peak of the PDP, wherein the dynamic range is the difference in power between the first peak and a noise floor of the PDP; and
determining at least one LOS base station based on the LOS detection measurements.

12. The method of claim 11, further comprising:
receiving a request from a network node to measure and report the LOS detection measurements for the plurality of base stations;
transmitting results of the LOS detection measurements towards the network node; and
wherein determining the at least one LOS base station further comprises receiving an indication of the LOS base station from the network node.

13. The method of claim 11, further comprising:
receiving from a network node, LOS decision assistance information, and wherein determining the at least one LOS base station based on the LOS detection measurements comprises determining the at least one LOS base station based on the LOS detection measurements and on the LOS decision assistance information.

14. The method of claim 11, wherein the LOS detection measurements comprises:
the channel impulse response at the UE; and
at least one LOS detection measurement method.

15. The method of claim 11, wherein the relative strength comprises one of a power variation and a signal magnitude.

16. The method of claim 11, wherein the LOS detection measurements further comprise a stability of an estimated Doppler spread of peaks of the PDP.

17. The method of claim 11, wherein the LOS detection measurement further comprise an angle of arrivals from base stations of neighboring base stations and a serving cell of the UE and angle of departure at base stations of a serving cell.

18. The method of claim 11, wherein the LOS detection measurements further comprise a time variation of a number of time of arrivals from the base stations of neighboring base stations and a serving cell base station over a time period.

19. The method of claim 11, wherein the LOS detection measurements further comprise a received signal strength being within a margin of an expected received signal strength.

* * * * *